United States Patent [19]

Mori

[11] Patent Number: 5,022,736
[45] Date of Patent: Jun. 11, 1991

[54] SOLAR RAY DEVICE FOR ILLUMINATION

[76] Inventor: Kei Mori, 3-16-3-501, Kaminoge, Setagaya-ku, Tokyo, Japan

[21] Appl. No.: 439,074

[22] Filed: Nov. 20, 1989

[30] Foreign Application Priority Data

Jan. 26, 1989 [JP] Japan ..................................... 1-16823

[51] Int. Cl.$^5$ ............................................. G02B 6/04
[52] U.S. Cl. ............................. 350/96.24; 350/96.18; 350/96.10
[58] Field of Search ............... 350/96.10, 96.15, 96.18, 350/96.24

[56] References Cited

U.S. PATENT DOCUMENTS

| 4,026,267 | 5/1977 | Coleman | 350/96.24 X |
| 4,297,000 | 10/1981 | Fries | 350/96.10 X |
| 4,511,755 | 4/1985 | Mori | 350/96.24 X |
| 4,653,472 | 3/1987 | Mori | 350/96.24 X |

Primary Examiner—John D. Lee
Assistant Examiner—Phan T. Heartney
Attorney, Agent, or Firm—Jordan and Hamburg

[57] ABSTRACT

A solar ray device for illumination is disclosed. The device comprises a solar ray collecting device and an illuminator. The solar ray collecting device has a plurality of optical lenses for focusing solar rays, a plurality of light-guiding cables with their light-receiving ends disposed at the focal points of the optical lenses, and a sensor for detecting the direction of the sun's rays and for creating a control signal causing the optical lenses to be directed toward the sun and thereby introducing the sun's ray into the light-guiding cables. The illuminator receives the light rays transmitted through the light-guiding cables and radiates the same through its lenses disposed opposite the light-emitting ends of the light-guiding cables.

8 Claims, 3 Drawing Sheets

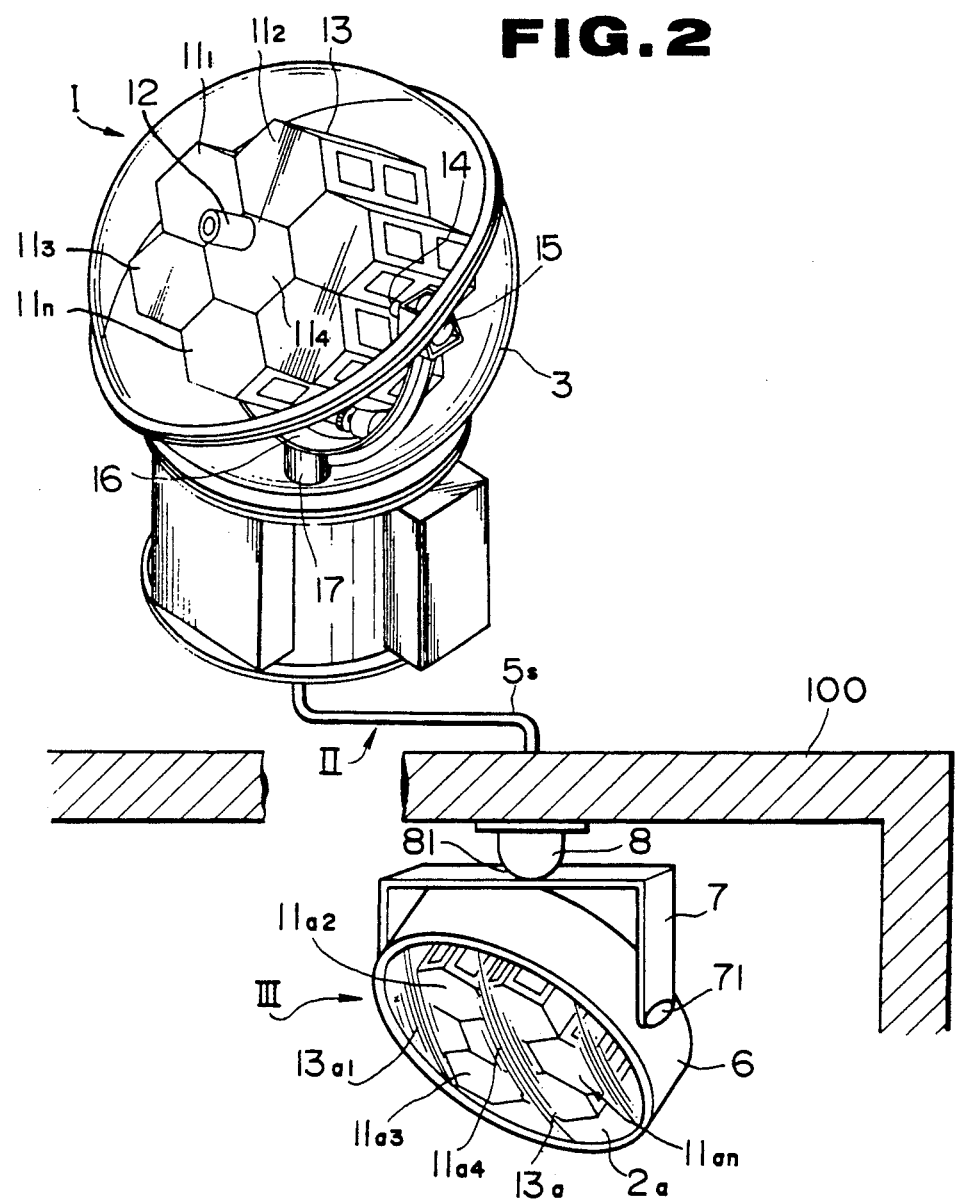
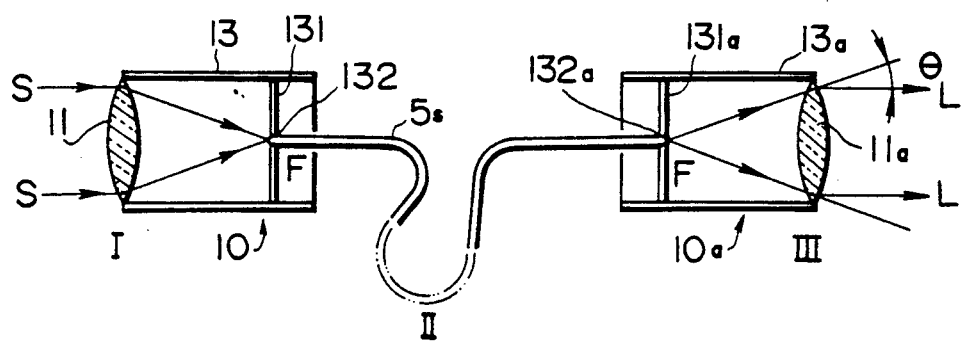

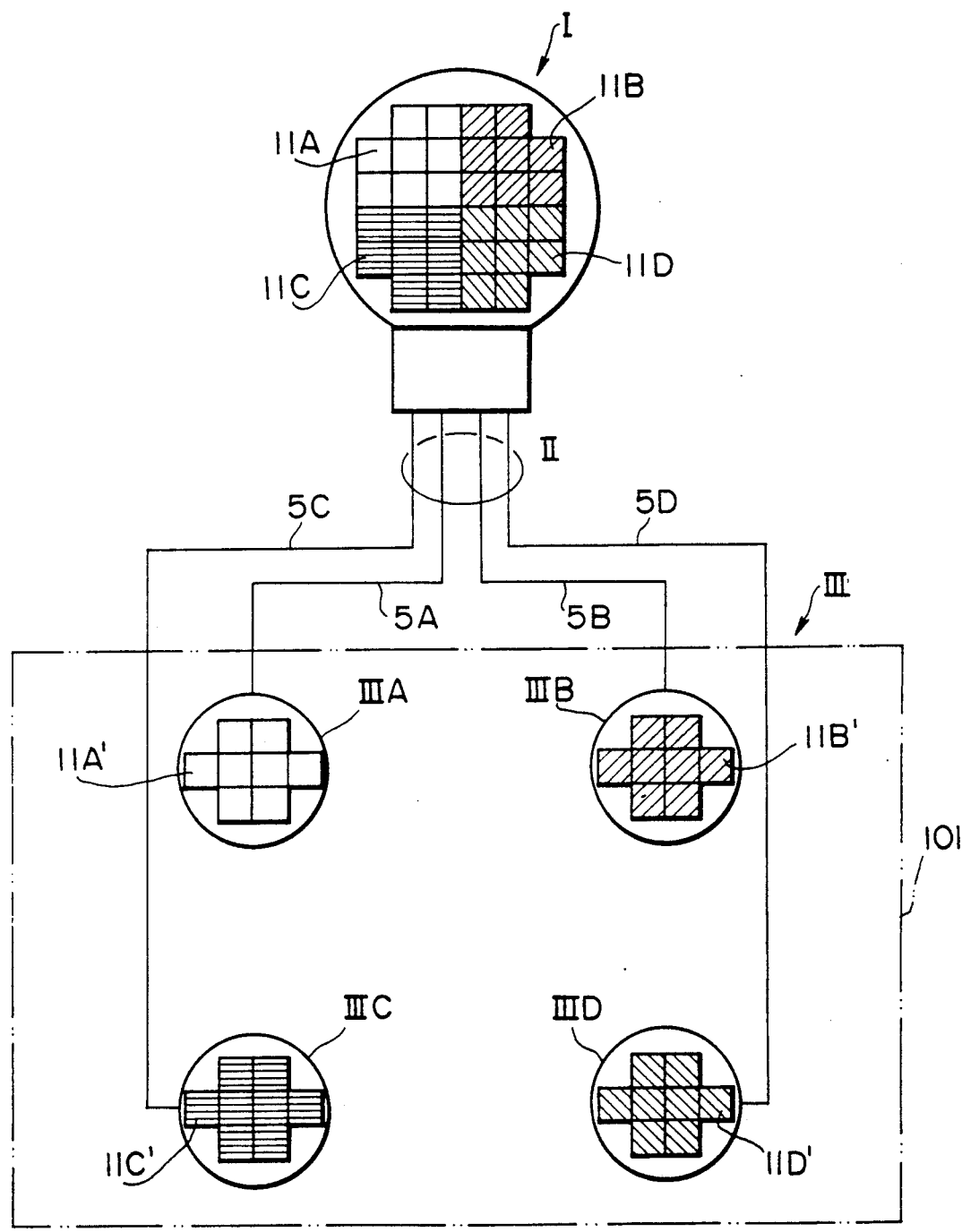

SOLAR RAY DEVICE FOR ILLUMINATION

BACKGROUND OF THE INVENTION

The present invention relates to a solar ray device for illumination and more particularly to an effective combination of a solar ray collecting device and a illuminator for radiating the solar rays collected by said solar ray collecting device. The solar ray collecting device has a control means for realizing the rotation of a number of optical lenses so as to always direct them toward the sun, a plurality of light-guiding cables (or fiber optic cables) into which the solar rays collected by said lenses are guided. The illuminator radiates the solar rays transmitted by said light-guiding cables (or fiber optic cables).

The present applicant previously proposed a solar ray collecting device accommodated in a capsule. The capsule is composed of a cylindrical base body, a transparent dome-shaped head and a transparent connecting portion for connecting said base body with said head. The solar ray collecting device comprises a large number of lenses (for example, 7, 19 . . . etc.) a solar ray direction sensor for detecting the sun's location, a supporting frame for integrally holding the lenses and sensor, a first revolving shaft for rotating the support frame, a first motor for rotating the first revolving shaft, a support arm for supporting the lenses and the motor, a second revolving shaft installed so as to intersect the first revolving shaft perpendicularly thereto, and a second motor for rotating the second revolving shaft. The direction of the sun is detected by means of the solar ray direction sensor and its detection signal controls the first motor and the second motor so as to always direct the lenses toward the sun, and the sunlight, focused by the lenses, is guided into a light-guiding cable (or fiber optic cable) through its end-surfaces set at the focal points of the lenses. The guided sunlight is transmitted through the light-guiding cable (or fiber optic cable) to wherever the light is needed for illumination or for other purposes. It shall be understood that a fiber optic cable is made up of a bundle of single cables each of which is made up of a large number of optical fibers, and a light-guiding cable is a bundle of a number of fiber optic cables.

The above-mentioned solar ray collecting device is intended to focus solar rays through lenses and transmit them through a light-guiding cable (or fiber optic cable) to wherever the light is needed. Said light-guiding cable (or fiber optic cable) is a bundle of cables whose light-emitting ends are to be unbound and separated from each other for directly radiating the light rays or for radiating the same through optical means such as lenses or the like. However, by this method it is difficult to uniformly illuminate a whole area. When an area to be illuminated is enlarged, the light radiation becomes unnaturally decreased in intensity at the peripheral portion. Furthermore, in the case where a solar ray collecting device and an illuminator are constructed as separate units with separate cabling, the mutual connecting of their light-guiding cables' ends has to be conducted by using a special connecting means which may result in an increased loss of light transmission.

SUMMARY OF THE INVENTION

It is an object of the present invention to provide a solar ray device for illumination which is capable of evenly projecting solar rays over a wide area and which requires no intermediate connection of the cables and ensures a minimal loss of light transmission.

It is another object of the present invention to provide a solar ray device for illumination of a high efficiency in collecting and transmitting solar rays.

It is another object of the present invention to provide a solar ray illuminator which has a similar construction that of a solar ray collector.

BRIEF DESCRIPTION OF THE DRAWINGS

FIG. 2 is a stereographic perspective view showing the construction of a solar ray device for illumination according to the present invention;

FIG. 3 is a view for explaining the principle of operating said device;

FIG. 4 is a view for explaining another embodiment of the present invention.

DESCRIPTION OF THE PREFERRED EMBODIMENTS

Figure 1:
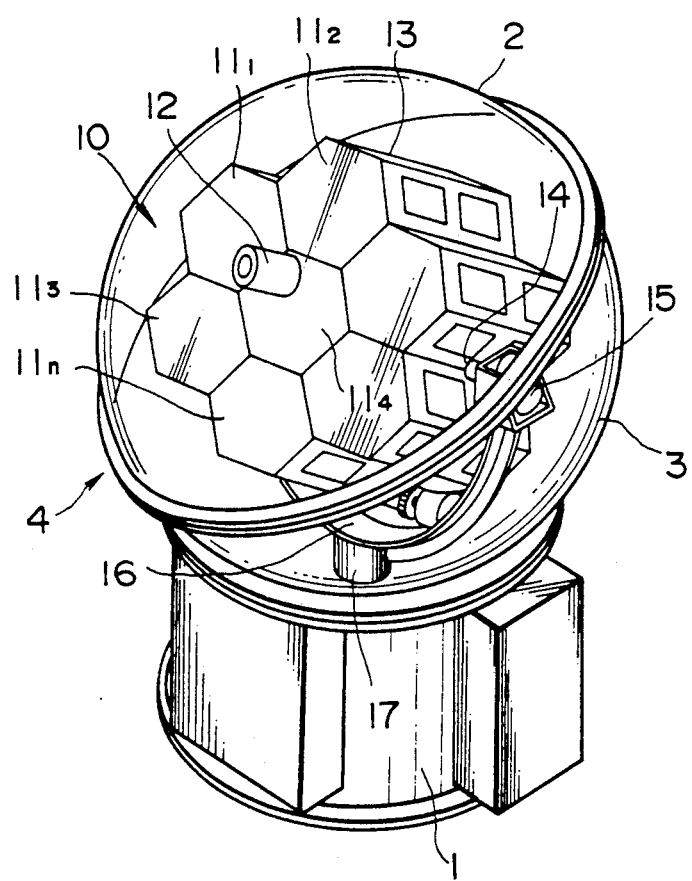
FIG. 1 is a view for explaining the prior art previously proposed by the present applicant.

FIG. 1 is an entire perspective view for explaining, by way of example, a solar ray collecting device previously proposed by the present applicant. In FIG. 1, a capsule 4 for use in the solar ray collecting device is composed of a cylindrical base body 1, a transparent dome-shaped head 2 and a transparent connecting portion for connecting said base body 1 with said head 2. As shown in FIG. 1, the solar ray collecting device 10 is accommodated in the capsule 4. The solar ray collecting device 10 comprises a large number of lenses (for example, 7, 19 . . . etc.) $11_1$–$11n$, a solar ray direction sensor 12 for detecting the sun's location, a support frame body 13 for integrally holding the lenses $11_1$–$11n$ and sensor 12, a first revolving shaft 14 for rotating the support frame 13, a first motor 15 for rotating the first revolving shaft 14, a support arm 16 for supporting the lenses $11_1$–$11n$ and the motor 15, a second revolving shaft 17 installed so as to intersect the first revolving shaft 14 perpendicularly thereto, and a second motor, not shown in FIG. 1, for rotating the second revolving shaft 17. The direction of the sun is detected by means of the solar ray direction sensor 12 and its detection signal controls the first motor and the second motor so as to always direct the lenses $11_1$–$11n$ toward the sun, and the sunlight, focused by the lenses $11_1$–$11n$, , is guided into a light-guiding cable (or fiber optic cable), not shown in FIG. 1, through its end-surfaces set at the focal points of the lenses. The guided sunlight is transmitted through the light-guiding cable (or fiber optic cable) to wherever the light is needed for illumination or for other purposes. It shall be understood that a fiber optic cable is made up of a bundle of single cables each of which is made up of a large number of optical fibers, and a light-guiding cable is a bundle of fiber optic cables.

The above-mentioned solar ray collecting device 10 is intended to focus solar rays through lenses and to transmit them through a light-guiding cable (or fiber optic cable) to wherever the light is needed. Said light-guiding cable (or fiber optic cable) is a bundle of cables whose light-emitting ends are to be unbound and separated from each other for directly radiating the light rays or for radiating the same through optical means such as lenses or the like. However, by this method it is difficult to uniformly illuminate a whole area. When an area to be illuminated is enlarged, the light radiation becomes unnaturally decreased in intensity at the peripheral portion. Furthermore, in the case where a solar ray collecting device and an illuminator are constructed as separate units with separate cabling, the mutual connecting of their light-guiding cables' ends has to be conducted by using a special connecting means which may result in an increased loss of light transmission.

In view of the above-mentioned drawbacks of the prior art, the present invention was made in order to provide a solar ray device for illumination which is capable of evenly projecting solar rays over a wide area and which requires no intermediate connection of the cables and ensures a minimal loss of light transmission.

FIG. 2 is a stereographic perspective view for explaining a solar ray illuminating device embodying the present invention. Said device is basically composed of a solar ray collecting device I, a light-guiding cable (or fiber optic cable) II and an illuminator (light-projecting device) III. The solar ray collecting device I is similar in its design to the prior art shown in FIG. 1 and therefore the parts that are similar to those previously shown with reference to FIG. 1 are denoted by the same reference numerals and a detailed explanation of their functions is omitted. As described above, solar rays collected by the solar ray collecting device I are guided into the light-guiding cables (or fiber optic cables) through their light-receiving ends, not shown in FIG. 2, disposed close to the focal points of the lenses 11 in the supporting frame body 13, and said cables corresponding to the lenses $11_1, 11_2, \ldots, 11n$ are bundled together to form one or more composite cables II which are led through a supporting arm 16 and taken out from the basic body 1. A light-guiding cable (or fiber optic cable) II taken out from the solar ray collecting device I is then led to the room illuminator III through an opening in a room's ceiling. Said illuminator III has the same quantity of lenses as the solar ray collecting device I. The lenses $11_1, 11_2, \ldots, 11n$ of the solar ray collecting device I correspond respectively to the lenses $11a1, 11a2, \ldots, 11an$ of the illuminator III and are coupled with each other by means of light-guiding unit cables $5_1$–$5n$ which are components of the light-guiding cable (or fiber optic cable) II. The lenses $11a1$ – $11an$ of the light illuminator III are integrally held by a holding frame body 13 which is mounted in a casing 6 covered with a front transparent cover 2a. Said casing 6 is rotatably secured to the supporting portions 71 of the arm 7, and said arm 7 is rotatably secured at its center to a supporting portion 81 of the supporting pipe 8 fixed to the ceiling 100 of the room so that the light can be projected in any desired direction. When the supporting portions 71 and 81 are provided with separate motors for rotating said portions about their axes, it becomes possible to select any desired direction for the light's projection by remotely controlling each of said motors.

FIG. 3 is a view showing a coupling for an input lens and an output lens for explaining the relation between the solar ray collecting device I, the light-guiding cable II and the illuminator III. Sunlight "S" focused through an input lens 11 mounted on the supporting frame 13 enters into a light-guiding cable 5S through its input end placed close to the focal position of said input lens. The input end of the light-guiding cable 5S is fitted into a fixture 132 at the center of the holding plate 131 provided at the bottom of the supporting frame 13 of the solar ray collecting device I, and the output end of the cable is secured in a fixture 132a on a holding plate 131a of the supporting frame 13a of the illuminator III. The fixture 131a is positioned near a focal point of the lens 11a through which parallel solar rays "L" are projected. The position of the fixture 132a in relation to the holding plate 131a can be adjusted so as to change the area to be illuminated with solar rays. In this case it is essential to keep the fixture off the lens 11a by a distance necessary for radiating solar rays through the lens at an angle not less than that of parallel light rays, i.e. not allowing light rays to converge. It is preferable to radiate the light rays through the lens at a diverging angle within $\theta$. However, it is also possible to use a concave lens for spreading out the light more widely and furthermore to adopt a semitransparent scattering plate instead of a transparent plate 2a.

FIG. 4 is a view showing another embodiment of the present invention. In FIG. 4, a solar ray collecting device I and illuminators IIIA, IIIB, IIIC and IIID are schematically illustrated. By way of example, lenses of a solar ray collecting device I are divided into four even groups 11A, 11B, 11C and 11D, and the solar rays collected through said groups of lenses are transmitted through corresponding light-guiding cables (or fiber optic cables) 5A, 5B, 5C and 5D to corresponding illuminators IIIA, IIIB, IIIC and IIID (installed at desired places) from which the distributed solar rays pass through corresponding groups of projection lenses 11A', 11B', 11C' and 11D' and are projected in desired directions. For instance, by selecting the direction of the light radiation from the illuminators IIIA, IIIB, IIIC and IIID arranged respectively at four corners of a space 101 shown by a two-dotted chain line, it is possible to create a variety of impressive lighting.

As is apparent from the foregoing description, according to the present invention, it may be possible to provide a solar ray device for illumination of a high efficiency in collecting and transmitting solar rays since the device is constructed so as to effectively collect solar rays by following the sun's movement, to transmit the collected solar rays through light-guiding cables (or fiber optic cables) directly (i.e. without intermediate connections causing a loss of light transmission) to corresponding light projecting lenses of illuminators arranged at desired places and to radiate the transmitted solar rays through said lenses. Furthermore, the manufacturing cost of the solar device for illumination may be reduced considerably since both of the solar ray collecting devices and the illuminators have a simple but similar construction relating to the arrangement of the optical lenses and the light-guiding cables.

I claim:

1. A solar ray device for illuminating a desired area comprising a solar ray collecting means having a first plurality of collector lenses for receiving and focusing solar rays, illuminator means disposed at said desired area to be illuminated, said illuminator means comprising an illuminator frame means mounted a second plurality of light projection lenses, said first plurality of collector lenses being equal to said second plurality of projection lenses to thereby define paired collector and projection lenses, a plurality of cable means comprising a separate light-guiding cable connected between each paired collector lens and projection lens, each of said separate light-guiding cables having a light-receiving end disposed at the focal point of a respective collector lens, sensor means for detecting the direction of the sun's rays and operable to direct said collector lenses towards the sun such that the sun's rays are introduced into the light-receiving ends of said separate light-guiding cables, each of said separate light-guiding cables further having a light-emitting end, said frame means having mounting means for mounting each of said light-emitting ends at a position such that solar light rays introduced into said separate light-guiding cables are emitted from said light-emitting ends to pass to said projection lenses to be radiated through said projection lenses and thereby projected to said desired area for illuminating said desired area.

2. A solar ray device according to claim 1, wherein each of said separate light-guiding cables is an integral cable element devoid of any intermediate interconnection such that each separate cable element extends uninterruptedly between each paired collector and projection lens and said light rays pass through each separate cable element uninterruptedly from a respective light-receiving end to a respective light-emitting end thereof.

3. A solar ray device according to claim 1, wherein said illuminator frame means comprises a frame on which said projection lenses are mounted, said mounting means mounting said light-emitting ends on said frame such that the position of said light-emitting ends is adjustable relative to said projection lenses to thereby change the area illuminated by said light rays radiating from said projection lenses.

4. A solar ray device according to claim 3, wherein said frame comprises a plurality of elongated support frame elements having two opposite ends, said projection lenses being disposed at one opposite end, said mounting means being disposed at the other opposite end.

5. A solar ray device according to claim 1, wherein said light-emitting end of each of said separate light-guiding cables is disposed at the general area of the focal point of a respective projection lens.

6. A solar ray device according to claim 1 further comprising a transparent front cover on said frame means disposed to cover each of said projection lenses.

7. A solar ray device according to claim 1 further comprising adjustment means on said frame means for adjusting the position and orientation of said frame means to thereby adjust the area being illuminated by said solar light rays.

8. A solar ray device according to claim 1, wherein said illuminator means comprises a plurality of illuminator sub-parts, one of said illuminator sub-parts being operable to radiate said solar light rays in one direction, and at least one other illuminator sub-part being operable to radiate said solar rays in a direction which differs from said one direction.

* * * * *